July 4, 1950 J. A. FRISCHMANN 2,513,928
HOSE SUPPORT FOR LIFT TRUCKS
Filed Dec. 3, 1947
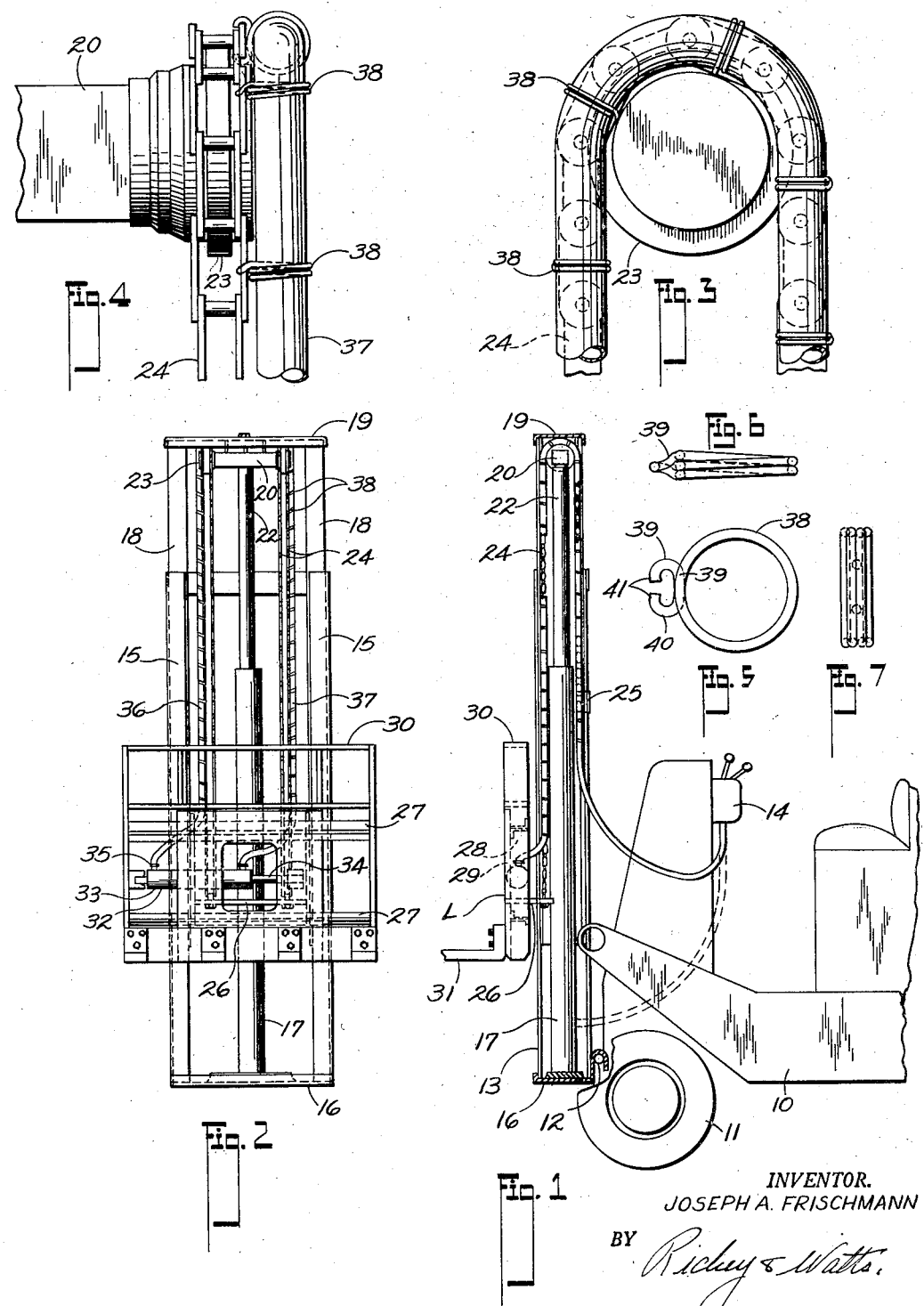
INVENTOR.
JOSEPH A. FRISCHMANN
BY
Richey & Watts.
ATTORNEYS Patented July 4, 1950

2,513,928

UNITED STATES PATENT OFFICE 2,513,928

HOSE SUPPORT FOR LIFT TRUCKS

Joseph A. Frischmann, Cleveland, Ohio, assignor to Towmotor Corporation, Cleveland, Ohio, a corporation of Ohio Application December 3, 1947, Serial No. 789,412

3 Claims. (Cl. 214—113)

This invention relates broadly to industrial lift trucks and pertains, more specifically, to improvements in the supporting structure and organization of the flexible conduits used in conjunction with movable hydraulic lift cylinders employed in such trucks.

The problem presented the designer of material-handling machines embraces not only the production of mechanism for the elevation and transportation of the load, but also includes the production of apparatus for the manipulation of the material during the exercise of loading, shifting, discharging and other similar operations. In machines of the type in which the elevation of the load is effected with a hydraulic lift, it is customary to employ additional hydraulic units to accommodate the secondary operations which, in the majority of cases, entails the support of the unit upon a movable part of the machine, such as the carriage or slide for the load-carrying platform. Obviously, such construction necessitates the use of one or more flexible conduits between the source of motive fluid and the portable cylinder, which, in turn, necessitates the use of a support for the slacked portion of the conduits during the retractive movement of the cylinder carrier.

One of the objects of the invention contemplates the support of the flexible conduit that leads to the secondary cylinder upon the chains or cables customarily employed in the elevating mechanism and further comprehends a clip or supporting clamp for the hose which will accommodate the free running movement thereof with the chain without impingement or undue wear.

Another object of the invention resides in an arrangement of the hose which will prevent entanglement thereof with the material on the load-carrying platform or other movable part of the machine, and also avoid the deleterious results effected by repeated reversals or sharp angle bends in localized areas of the hose.

Further objects of the invention reside in the provision of a clip which will effect the support of a flexible hose upon a chain in an efficient and reliable manner, a clip which may be assembled upon the hose and chain or removed therefrom with ease and dispatch, and a clip which is economic of manufacture, sturdy of structure, and susceptible of interchangeable assembly on parts of like size and form.

Other objects and advantages more or less ancillary to the foregoing, and the manner in which all the various objects are realized, will appear in the following description, which, considered in connection with the accompanying drawings, sets forth the preferred embodiment of the invention.

Referring to the drawings:

Fig. 1 is a side elevation of the forward portion of an industrial truck embodying the invention, portions thereof being broken away and shown in section in the interest of clarity;

Fig. 2 is a front elevational view of the mechanism illustrated in Fig. 1;

Fig. 3 is an enlarged side elevational view of a fragmentary portion of the chain and hose shown in Fig. 1;

Fig. 4 is a front elevational view thereof;

Fig. 5 is a plan view of the improved hose clip, and

Figs. 6 and 7 are elevational views thereof.

Referring first to Fig. 1, the vehicle chosen herein for the purpose of illustration comprises, generally, a body 10 mounted on wheels 11 supported on a front driving axle which includes a frame cross member 12 constituting the fulcrum for a vertically disposed mast 13. The mast is organized for forward and rearward inclination through a hydraulic cylinder (not shown) controlled in the customary manner through a valve unit 14 mounted in the forward portion of the vehicle. In the present case, the mast comprises a pair of spaced channels 15 provided with a bottom tie plate 16 having a hydraulic lift cylinder 17 thereon for the actuation of a slide 18 which is telescopically engaged in the channels 15. The slide comprises a rectangular frame having a top cross member 19 thereon which is adapted for abutting engagement with a crosshead 20 mounted on the free end of the piston rod 22. The crosshead is designed for the support of rollers 23 which are provided with chains 24 having the ends thereof connected respectively to a fixed cross rail 25 on the mast and a bracket 26 which is secured to the slide 18 and formed to provide the support for the load-carrying member L. The crosshead is disposed in spaced relation with the lower face of the slide top member 19 when the piston is in its retracted position, hence the initial elevation of the slide is effected through the medium of the chains, upon movement of the piston, and continued movement thereof occurs when the crosshead is brought into abutting engagement with the top member 19.

For the purpose of illustration, the improved hose support is shown herein as associated with a carriage cross slide designed to effect lateral adjustments of the load-carrying platform during such material-handling operations as require alignment of the load with some immobile body. In detail, the carriage cross slide comprises a pair of parallel guide rails 27 mounted on the outer face of the slide 18 in normal relation to the major axis thereof. The rails are formed with opposed flanges interengaged with horizontal plates 29 on a carriage 30 constructed for the support of the load-carrying platform or forks 31. The carriage is reciprocated by a hydraulic ram 32 disposed in parallel relation with the guide rails 27 and rearward the inner face of the carriage. The ram comprises a cylinder 33 anchored on the slide 18, a piston 34 coupled with the carriage 30 and fittings 35 in the opposed ends of the cylinder for the support of flexible conduits 36 and 37 that carry the motive fluid from the valve control unit 14. The valve is coupled with a source of fluid under pressure (not shown) mounted in the vehicle body in the customary manner.

Since the cylinder 30 is carried by the movable slide 18, the length of the conduits 36 and 37 must be designed to accommodate the elevation of the slide to its fully distended position. Hence, in order to avoid entanglement of the hose, when the slide is lowered, each of the hose sections that lead from the cylinder to the control valve is yieldably secured to the chains 24 so that they may run therewith over the rollers 23. With such construction the rollers on the crosshead will raise or lower the portion of the body of the hose that rides thereover during the movement of the slide while the chains maintain the other portions of the hose in aligned relation therewith.

The supporting structure for the hose comprises a plurality of clips 38 preferably formed of spring steel wire wound to encircle the hose with a slight clearance thereover. The clips are further configured with tangential arms 39 having inturned end portions 40 disposed in a common plane for engagement with the opposed lineal edges of a side link of the chain. The free ends 41 of the inturned or looped portions of the arms are of sufficient length to afford substantial engagement thereof with the inner face of the side links when the loops are sprung thereover and seated in the openings defined by the solid links in the chain. The clips are arranged in equi-spaced relation throughout the entire length of the chain, and are also spaced relative to each other and the diameter of the rollers to prevent the formation of sharp angle bends in the hose during the movement of the chains over the rollers.

From the foregoing it will be seen that the hose sections are secured to the chains for lateral independent movement relative thereto, but will be carried thereby during the movement of the slide, thus avoiding the formation of slacked or looped sections therein and the hazard of fracture or destruction of the hose where the slide is disposed in its lowered position.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. In a lift truck embodying a body having a mast on the forward end thereof, a slide thereon, a hydraulic lift for the actuation thereof, a piston rod therein, guides thereon carrying chains connected to the mast and slide and a hydraulic ram mounted on the slide and movable therewith, means for conducting motive fluid to the hydraulic ram comprising a flexible conduit connected to the ram, a plurality of spring wire clips having a body portion passing around said conduit and having hooked end portions forming a loop substantially in the plane of said body portion, said end portions being separable to pass over a side link of said chain intermediate its ends.

2. In a lift truck embodying a mast, a slide therein, a hydraulic lift for the actuation thereof, guides on the piston rod for said lift, chains thereon coupled with the slide and mast, a hydraulic ram carried by said slide, and a flexible conduit for conducting motive fluid thereto, means for the support of the flexible conduit during the translation of the slide comprising a plurality of clips having a body portion loosely engaged with the conduit and hooked end portions thereon resiliently engaged with the edges of side links of the chains, said hooked end portions also passing behind said links to securely and positively retain the hose on the chain.

3. In a lift truck embodying a mast, a slide therein, a vertically movable member on the mast for elevating the slide, a hydraulic ram mounted on said slide, and a hose for supplying motive fluid to said ram, means for supporting said hose comprising rollers on the vertically movable member, chains reeved thereover with the ends thereof connected to the mast and slide, a plurality of spring wire helical rings encircling the hose and terminal arms on said rings passing around the edges and behind the side links in one side of the chain.

JOSEPH A. FRISCHMANN.

REFERENCES CITED

The following references are of record in the file of this patent:

UNITED STATES PATENTS

| Number | Name | Date |
|---|---|---|
| 2,270,664 | Weaver | Jan. 20, 1942 |
| 2,432,411 | Guerin et al. | Dec. 9, 1947 |
| 2,457,366 | Guerin | Dec. 28, 1948 |